United States Patent [19]
Gilligan et al.

[11] Patent Number: 5,374,942
[45] Date of Patent: Dec. 20, 1994

[54] MOUSE AND METHOD FOR CONCURRENT CURSOR POSITION AND SCROLLING CONTROL

[76] Inventors: Federico G. Gilligan; Fernando D. Falcon, both of Lavalle 682, 1047 Buenos Aires, Argentina

[21] Appl. No.: 105,901

[22] Filed: Aug. 12, 1993

Related U.S. Application Data

[63] Continuation-in-part of Ser. No. 14,388, Feb. 5, 1993, Pat. No. 5,313,229.

[51] Int. Cl.⁵ ............................................. G09G 3/02
[52] U.S. Cl. ................................. 345/157; 345/163; 345/123
[58] Field of Search ................. 345/163, 164, 165, 166, 345/167, 159, 157, 160, 161, 162, 121, 123; 74/471 XY; 395/157, 155; 364/927.621

[56] References Cited

U.S. PATENT DOCUMENTS

| | | | |
|---|---|---|---|
| 4,891,632 | 1/1990 | Chang | 345/165 |
| 5,261,054 | 11/1993 | Lerner | 345/163 |

FOREIGN PATENT DOCUMENTS 60-186925  9/1985  Japan.

OTHER PUBLICATIONS

IBM Technical Disclosure Bulletin 27(11):6788.

*Primary Examiner*—Alvin E. Oberley
*Assistant Examiner*—Aaron Banerjee
*Attorney, Agent, or Firm*—Michael J. Striker

[57] ABSTRACT

An improved mouse for concurrent cursor position and scrolling control is disclosed, in which a supplementary scrolling control device with a double reluctance characteristic is included for achieving a double operational mode using a single finger of the hand that holds and operates the mouse. The double mode operation is combined with an improved method for performing scrolling axis settings and scrolling scale settings through a number of combined mouse movements or gestures for dynamically controlling scrolling at the same time the mouse is operated.

18 Claims, 14 Drawing Sheets

MOUSE AND METHOD FOR CONCURRENT CURSOR POSITION AND SCROLLING CONTROL

This is a continuation-in-part of pending U.S. patent application Ser. No. 08/014,388, filed Feb. 5, 1993, now U.S. Pat. No. 5,313,229.

BACKGROUND OF THE INVENTION

A mouse and associated method capable of controlling a cursor position in a display means while concurrently scrolling the display contents is disclosed in the referenced application ("parent application"). The features of the disclosed mouse (hereinafter the "scrolling mouse") are achieved by a structural improvement over a conventional mouse, consisting in including a spring-loaded supplementary control means in the mouse structure for generating a supplementary control signal that can be varied in magnitude and sign to control the scrolling rate and heading respectively. The structural improvement is combined with an operational method for setting the scrolling axis to a plurality of options (i.e., the "x", "y" or "z" axis), at the same time the cursor is moved. The operational method is based in moving the cursor so as to approximately define a cursor trail pattern recognizable by a computer program, being the recognized patterns used as commands to set the scrolling axis.

In this way, any desired data entity of a certain data space can be reached in a fast and efficient manner by extending the mouse functionality beyond the limits of the displayed image.

However, at the present state of the art, scrolling operations still demand a significant amount of computing power, which limits the scrolling speed when scrolling incrementally on a low scale (e.g., line by line in a text document). This is more evident when the mouse disclosed in the parent application is used in graphical environments, as for example Windows of Microsoft Corporation.

Furthermore, it has been observed that a mouse operator usually needs to scroll a display in incremental steps at different scales (i.e., line-by-line, page-by-page, etc.). For example in word processing applications, when browsing a text file searching for a particular paragraph, a page-scale scrolling may be appropriate, while in changing attributes of words or characters that are located within a long paragraph (that can not be displayed completely in a single screen), a line-scale scrolling may be needed so as to scroll the paragraph slowly until the desired word or character appears in the display.

It has also been observed that in a normal session operating a computer with a scrolling mouse, a user generally needs to vary the scrolling rate from nearly zero, so as to control the logic cursor position with high precision, to a high enough rate, so as to reach the desired field in the lowest time possible. However, when high precision is needed, a very low scrolling rate might be uncomfortable because the operator generally looses track of the time elapsed between one incremental scrolling command and the next.

Accordingly, there is a need for an improved scrolling mouse and associated method, capable of providing a better and more flexible scrolling control, to improve performance and enhance productivity.

SUMMARY OF THE INVENTION

It is a general object of the present invention to provide an improved scrolling mouse and associated method which not only enables an operator to drive a cursor over a display means, but also dynamically control scrolling of the display in any direction and at a plurality of speeds and scales.

It is a basic object of the present invention to provide an improved scrolling mouse capable of issuing incremental scrolling commands from a step-by-step mode to an autonomous variable rate mode.

It is another basic object of the present invention to provide a mouse and associated method with the added functionality and versatility stated above, but that can be manufactured with minimum added cost and taking advantage of mouse structures widely used in the industry.

It is a fundamental object of the present invention to provide an improved scrolling mouse and associated method that can be transparently implemented in contemporary mouse applications and that is compatible with conventional mouse usage methods.

It is another object of the present invention to provide an improved scrolling mouse and associated method having the features set forth above but that requires minimum computing power for its implementation.

It is still another object of the present invention to provide a mouse and associated method having the functionality and versatility set forth above while requiring minimum training to take advantage of its operational features.

According to the invention, the improved scrolling mouse structured to provide a double-mode operability includes an improved supplementary control means in which the displacement range of the supplementary control means' displaceable body (i.e., the lever) is split into two zones with different reluctance levels, so as to provide a tangible effect defining a clear boundary between both zones. In this way, starting an excursion from its equilibrium position, the lever is moved against a first reluctance level until a certain displacement threshold is reached at which a second, higher reluctance level is encountered. The double reluctance characteristic of the improved supplementary control means provides a tactile feedback about position of said displaceable body relative to said displacement threshold, and serves as a physical basis for an operational method for generating either single incremental scrolling commands or alternatively a burst of them, depending on the actual lever position.

More specifically, in the lower reluctance zone, when the lever is moved from its equilibrium position in any of both directions, a single incremental scrolling command is generated when the absolute value of the lever displacement equals a pre-defined lever displacement threshold (called single command threshold), only when growing from a lower absolute value to a higher absolute value (i.e., departing from it's equilibrium position). When the absolute lever displacement value crosses the single command threshold approaching its equilibrium position (i.e., a negative variation of the absolute value), no scrolling command is generated. Moreover, in the higher reluctance zone, incremental scrolling commands are generated automatically, at a rate related to the absolute value of the displacement, starting from a minimum rate at the boundary between high and low reluctance zones. In either case, the sign of the lever displacement determines the scrolling heading.

This characteristic of the supplementary control means allows an operator to scroll the screen contents in a step-by-step mode, by moving the lever within the low reluctance zone in a repetitive fashion, generating a single incremental scrolling command in each excursion of the lever, when crossing the single command threshold. Alternatively, by pushing the lever beyond the boundary between both zones, the screen contents can be scrolled at an autonomous variable rate determined by the extent the lever has been pushed beyond the reluctance boundaries. Since both modes of operation are achievable using a single finger of the hand that holds the mouse, maximum versatility with minimum interference to mouse operation is obtained.

The double reluctance characteristic of the improved supplementary control means is combined with an improvement of the method disclosed in the parent application, to provide full scrolling control with a single supplementary control means.

In the method disclosed in the parent application, three cursor trail patterns, i.e., linear horizontal, linear vertical and circular, are used for selecting the scrolling axis from among three possible options; "x", "y", and "z", respectively. In the improved method, however, linear patterns continue to select the scrolling axis (i.e., "x" or "y"), while circular patterns are detected independently of linear patterns, affecting a separate attribute of scrolling operations (e.g., the scrolling scale). In this way, since circular patterns are used to perform a different function and independently from linear patterns, one or more consecutive circular patterns can be embedded in the cursor's motion or combinations of circular and linear patterns to compose more complex commands, called "dynamic scrolling commands". For example, a combination of a circular pattern and a linear pattern can be used to upgrade the scrolling scale and set the scrolling axis in a single dynamic scrolling command.

Thus, combining the double operational mode of the supplementary control means with the enhanced capabilities of the associated method allows a more flexible and precise scrolling control, while substantially maintaining the simple concept and handling techniques of a conventional mouse.

BRIEF DESCRIPTION OF DRAWINGS

The objects, features and advantages of the present invention will now be illustrated in more detail by the following detailed description, reference being made to the accompanying drawing in which:

FIG. 1c is a side elevational view of the mouse shown in FIG. 1a;

FIG. 2a is a detailed side view of the supplementary control means shown in FIG. 1a;

FIG. 2b is a schematic horizontal detailed view of the supplementary control means shown in FIG. 1a;

FIG. 3b is a detailed horizontal cross-sectional view of the supplementary control means taken along the section line C—C' of FIG. 2a;

FIG. 4a is a schematic diagram representing the operational method associated with the supplementary control means shown in FIG. 1a;

DETAILED DESCRIPTION OF PREFERRED EMBODIMENTS

Figure 1B:
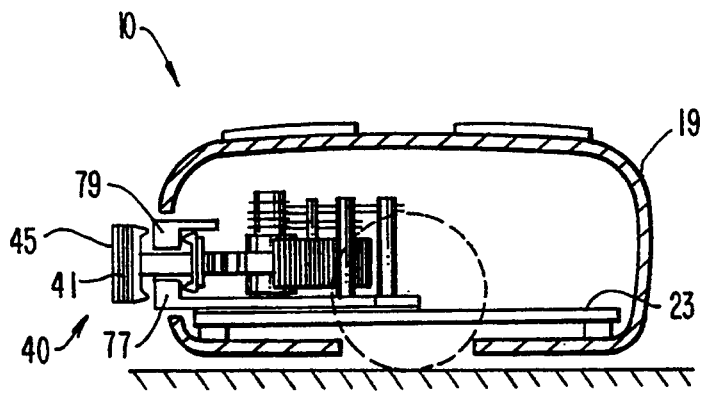
FIG. 1b is a transverse cross-sectional view through the mouse shown in FIG. 1a taken along the section line A—A' of FIG. 1c.
Figure 1A:
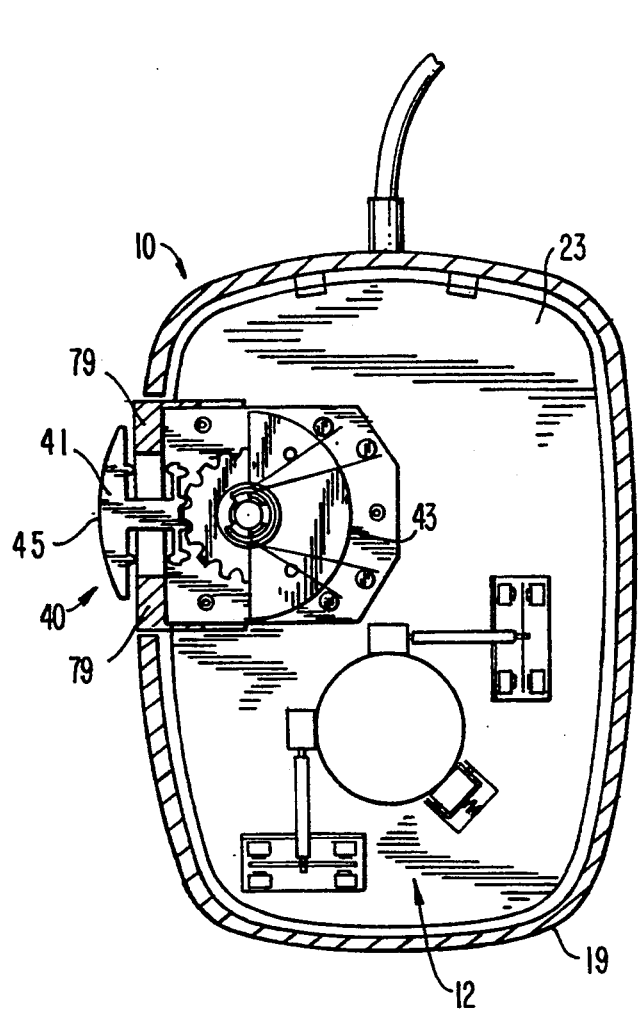
FIG. 1a is a schematic horizontal cross-sectional view through an embodiment of a mouse according to the invention, showing a mechanical portion of the supplementary control means for scrolling.
Figure 1C:
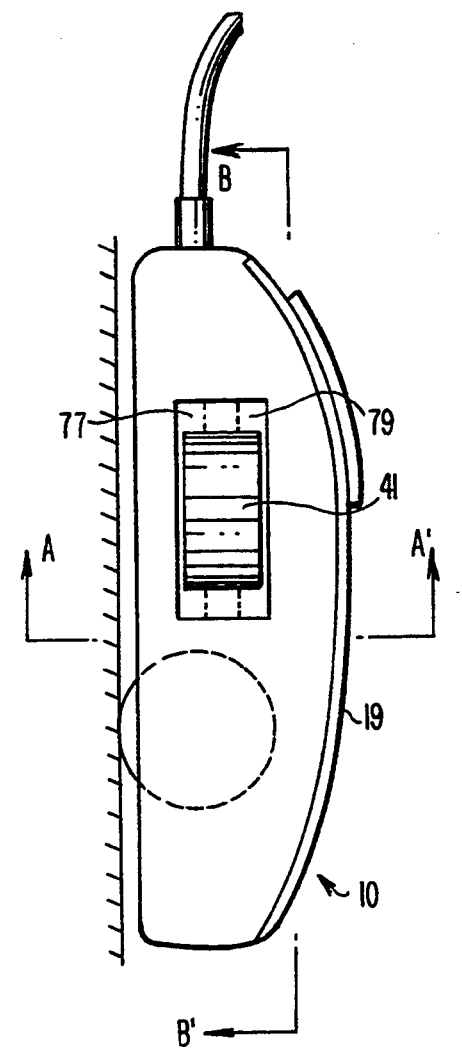

FIG. 1a, 1b and 1c show a mouse 10 according to the present invention, this particular embodiment being derived from a conventional mouse structure widely used in the industry, based on a rolling-sphere motion transducer 12. Mouse 10 comprises a housing 19 and a printed circuit board 23 supporting the electronic components of the mouse and the x-y transducer 12 as well. According to the invention, mouse 10 also comprises a supplementary control means 40 for concurrent control of cursor position and scrolling, which in the preferred embodiment is also mounted on circuit board 23 as shown in FIGS. 1a and 1b.

In the preferred embodiment of the supplementary control means 40, shown in FIGS. 1a through 1c, the displaceable body comprises a sliding knob 41 displaceable along a linear path provided by a pair of rails 77 and 79, which are part of the supplementary control means 40 structure. Knob 41 has an approximately cylindrical surface 45, so as to alter as little as possible the contour of housing 19 while providing a safe handling and a tight control of the knob's position.

Figure 2A:
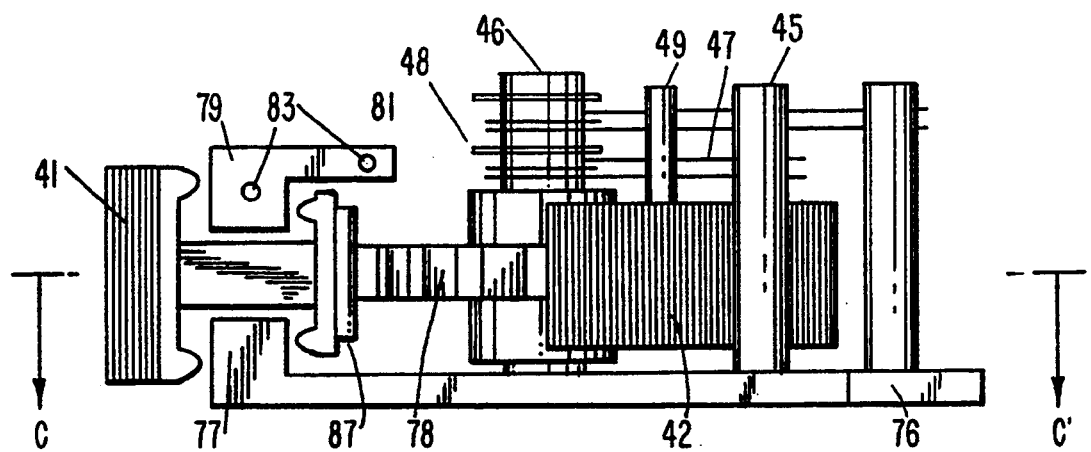
Figure 2B:
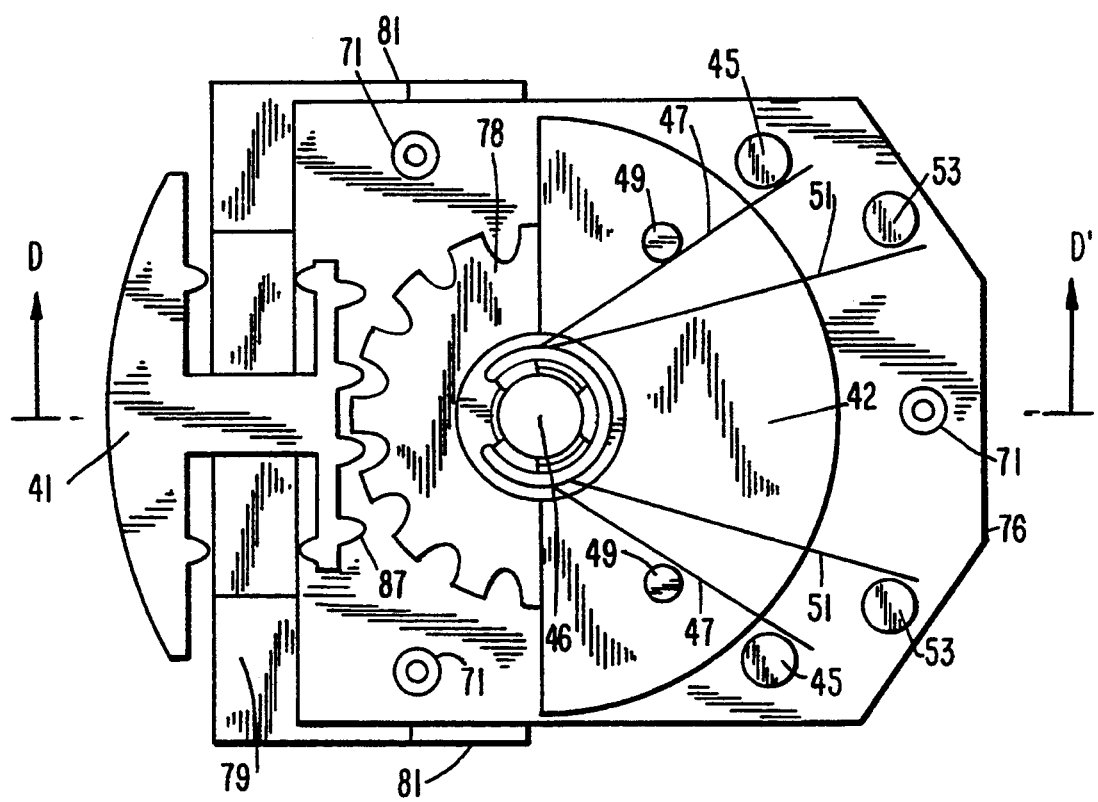

The detailed structure of the improved supplementary control means 40 having a double reluctance characteristic is shown in FIGS. 2a and 2b. Supplementary control means 40 comprises a movable part 42 approximately semicircular shape mounted rotatably on an pivot axle 46, fixed to a baseboard 76. Movable part 42 acts as a housing for a rotation transducer 43, as is explained herein below. Movable part 42 further comprises a half toothed-wheel 78 fixed to it and engaged with knob 41 through gear 87 so that knob 41 and movable part 42 are tightly coupled. Movable part 42, and hence knob 41, are both urged to respective released or equilibrium positions by spring means 47, which consists of a resilient wire 47 wound around pivot axle 46 and held in place by a pair of stops 49, fixed to movable part 42, and by another pair of stops 45, fixed to baseboard 76. Resilient wire 47 provides the first reluctance level. According to the invention, a second spring means 51 is provided to produce the second reluctance level. Resilient wire 51 is wound around pivot axle 46 as well, but at a higher vertical position, separated from wire 47 by ring 48 and held in place by stops 49 and a pair of additional stops 53, also fixed to baseboard 76. As movable part 42 moves from its equilibrium position, wire 47 reacts to provide the first (lower) reluctance level. At an angle, and hence at a knob displacement, determined by relative positions of stops 49 and stops 53, one of stops 49 gets in contact simultaneously with both wires 47 and 51, producing the second (higher) reluctance level. Although it is not shown in the figures, stops 45 and/or 53 can be made of a conducting material so that each pair of stops and their associated resilient wire serve as electric switches indicating when the knob 41 is in its equilibrium position in one case, or when the knob 41 has entered the low reluctance zone in the other case.

Rails 77 and 79 guide knob 41 through all its excursion. Rail 77 is part of baseboard 76, and rail 79 is secured in its place by a pair of covers 81, rising from both sides of baseboard 76. Rail 79 is fixed to covers 81 through a pair of securing devices 83.

Figure 3A:
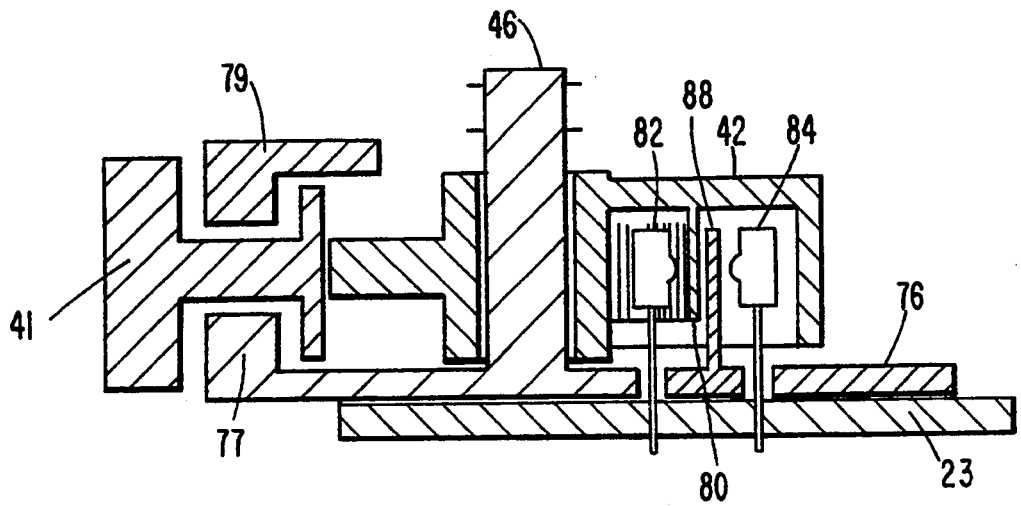
FIG. 3a is a detailed transverse cross-sectional view of the supplementary control means taken along the section line D—D', of FIG. 2b.
Figure 3B:
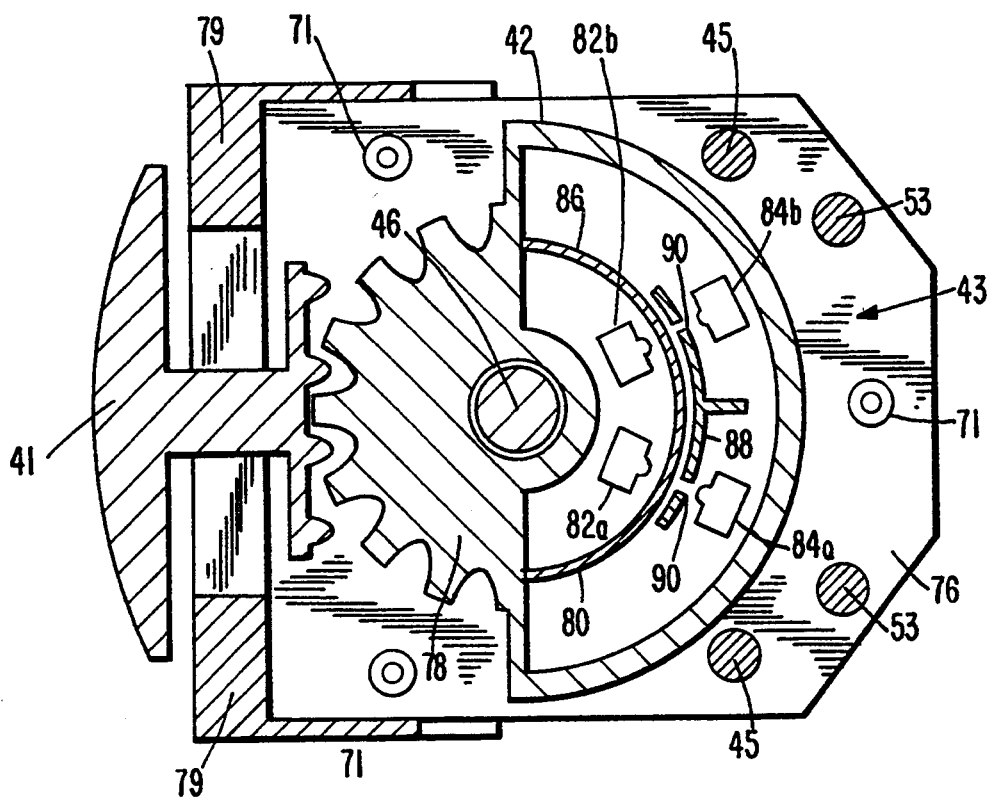

FIGS. 3a and 3b show detailed views of the mechanism and mounting of supplementary control means 40. The baseboard 76 is mounted on the printed circuit board 23 and fixed to it by three securing devices 71 that provide stability to baseboard 76 and offset the force exerted by the operator finger over knob 41. Baseboard 76 has supporting axle 46 on which movable part 42 is pivotally mounted.

Movable part 42 includes an inner, concentric semicircular slotted skirt 80. At two angularly spaced locations, opto-coupler pairs 82a, 82b and 84a, 84b are placed as shown in FIGS. 3a and 3b. Each opto-coupler pair comprises a light emitting diode (LED) 82a or 82b and a photo-transistor 84a or 84b mounted directly on printed circuit board 23, and connected to it advantageously by soldering. The skirt 80 has a plurality of slots 86 evenly spaced and the skirt 80 is positioned to alternately block and let through light emitted by each LED 82a or 82b to its corresponding photo-transistor 84a or 84b, as movable part 42 rotates when knob 41 is operated. Slotted skirt 80 together with opto-couplers 82a or 82b and 84a or 84b configure incremental rotation transducer 43. The angle between one pair of opto-couplers 82a, 84a and the other 82b, 84b is set according to the slot density adopted for the skirt 80, so that the outputs generated have a phase difference close to 90°, as required to extract the motion sign information out of these signals.

The baseboard 76 further includes a fixed skirt portion extending circumferentially only over the same portion of the circumferential extent as the slotted skirt 80 and having two complementary fixed slots 90 each positioned between the photo-transistor 84 and light emitting diode 82. Thus the fixed skirt portion 88 acts as a diaphragm or mask to enhance resolution of transducer 43 regardless of tolerances obtained when soldering the opto-coupler components to the printed circuit board 23. Utilizing suitable small opto-coupler pairs such as the Motorola's MLED71 and MRD701 and a slot width of 1 millimeter, a resolution of approximately 40 light transitions in a 45° rotation may be obtained, for a skirt diameter of 2.5 centimeters, which allows a smooth enough operation. The light transitions detected by opto-couplers 82 and 84 represent incremental rotation units of movable part 42 and hence incremental displacement units of knob 41. The incremental information can be converted to absolute knob displacement by accumulating successive increments, starting from a default count at the equilibrium position. This approach allows a direct digital output with minimum part count, which is highly desirable in a low cost device such as a mouse, and is compatible with the resolution required for the scrolling control application of supplementary control means 40. The scrolling control signal generated by transducer 43 can be transmitted to the computer by a number of widely known means and techniques, as disclosed in the parent application.

The structure of the supplementary control means 40 disclosed herein provides a robust, self-contained device of very simple assembly that can be mounted directly on the printed circuit board 23. The cylindrical geometry of the entire structure allows direct soldering of the opto-couplers components to printed circuit board 23, thus simplifying manufacturing and reducing overall cost.

Moreover, since the shape of knob 41 produces minimum alteration to the contour of the mouse housing and since it is movable along a linear path (therefore maintaining always the same position relative to the mouse housing sides), this particular embodiment has the advantage of being highly ergonomic, facilitating the mouse handling and allowing precise operation of knob 41 while the mouse is moved in normal operation.

Figure 4A:
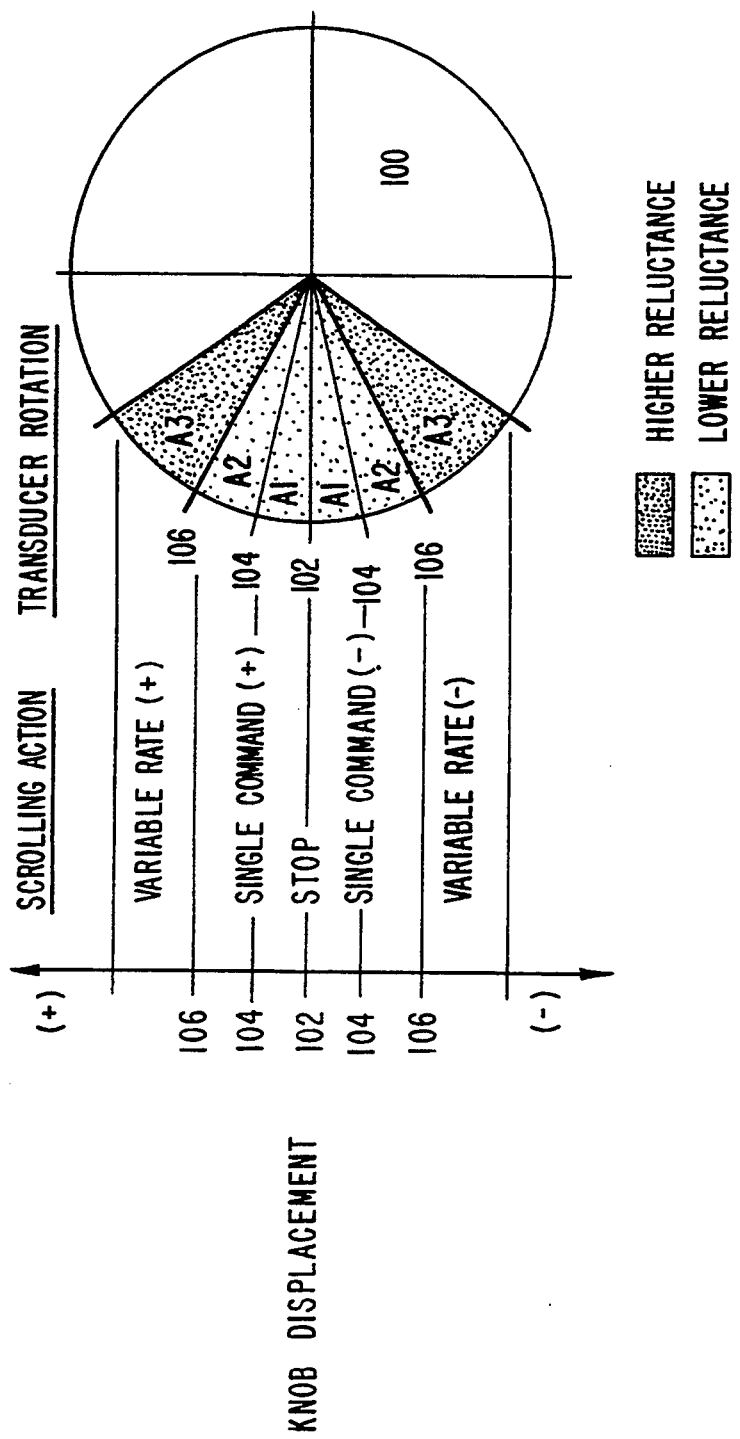

The double reluctance characteristic of the improved supplementary control means and the way it relates to the operational method is diagrammed in FIG. 4a, in which the rotation detected by transducer 43 is represented as an angle measured from an equilibrium position 102, spanning a portion of circle 100. The corresponding positions of knob 41 are also represented at the left side of the figure. In circle 100 several singularities are represented in the rotation range of the transducer 43, defining different zones represented as shaded areas. The corresponding singularities in the displacement range of knob 41 also represented in FIG. 4a.

As is shown in FIG. 4a, the zone marked as "LOWER RELUCTANCE" surrounds symmetrically the equilibrium position 102, inserted into the "HIGHER RELUCTANCE" zones, encountered as the transducer 43 is rotated in any direction (+ or −) passing the reluctance boundaries 106.

As it has been explained herein before, the double reluctance characteristic allows a tactile feedback of displacement of knob 41, defining two operational modes, one for issuing single incremental scrolling commands, while the other for scrolling a display at selectable rates under the operator's control.

For this purpose, a pair of single-command displacement thresholds 104 are defined inside the low reluctance zone, symmetrically located relative to the equilibrium position 102, defining three subzones in each half-range called A1, A2 and A3, as shown in FIG. 4a.

Thresholds 104 are trigger levels of the supplementary control signal, defined in accordance to actual dimensions and parameters of the supplementary control means 40, at approximately half the way between the equilibrium position 102 and reluctance boundaries 106. The single incremental scrolling commands are generated only when knob 41 is displaced overpassing thresholds 104, going from a lower absolute value of displacement to a higher one. In other words, a single incremental scrolling command is triggered when there is a transition from any of sub-zones A1 to the corresponding adjacent zone A2. The sign of the single incremental scrolling command is set in correspondence to the knob displacement sign.

Figure 4B:
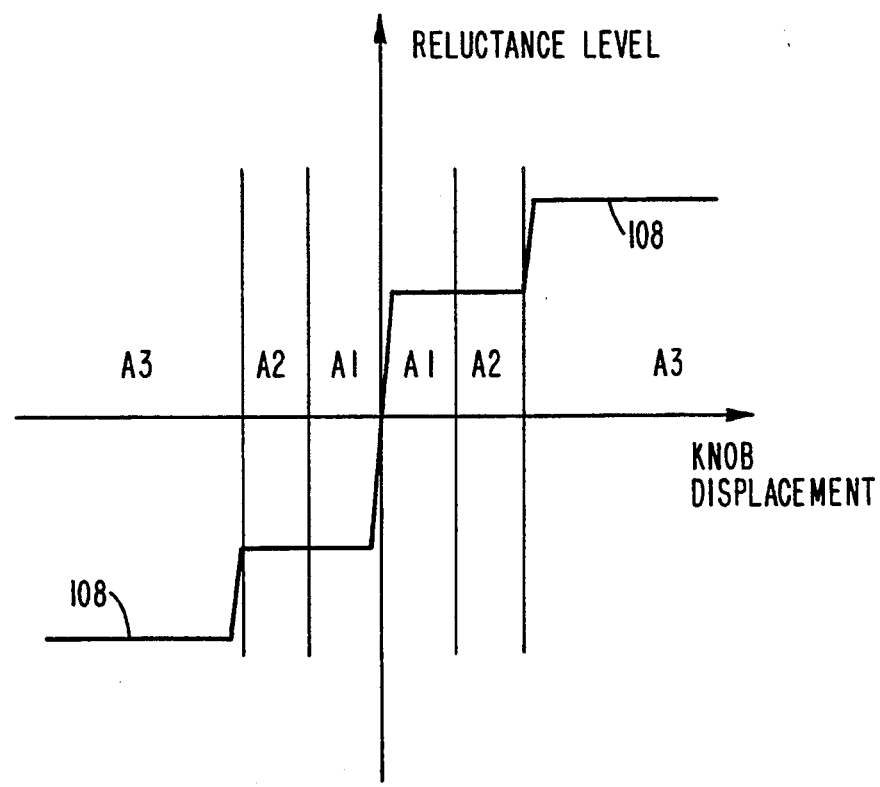
FIGS. 4b and 4c are x-y diagrams representing the variation of the reluctance level of the supplementary control means and the scrolling rate associated, respectively, as functions of the knob displacement.
Figure 4C:
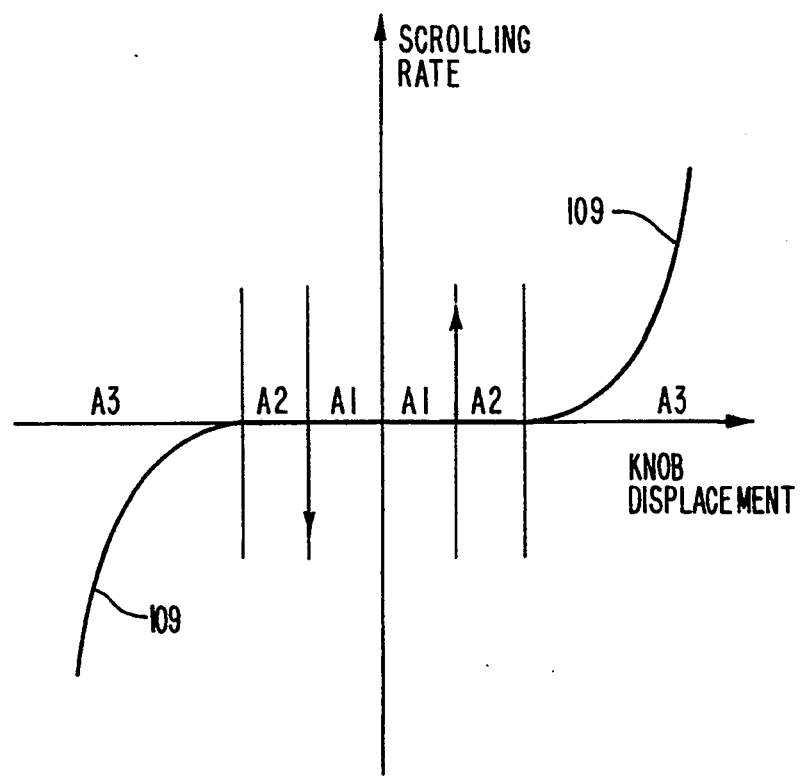

FIGS. 4b and 4c are a representation of the reluctance levels and the rate of generation of incremental scrolling commands correspondingly, as functions of the signed knob displacement. In FIG. 4b, the reluctance singularities produced by spring means 47 and 59 are represented in curve 108. The arrows drawn in FIG. 4c between corresponding subzones A1 and A2 represent the single incremental scrolling commands, and curve 109 represents an example of a possible function relating the rate of generation of incremental scrolling commands vs. the lever displacement.

In this way, when an operator of mouse 10 desires to scroll a visual display in a step-by-step fashion, he or she may do it by producing repetitive excursions of knob 41 within the lower reluctance zone, in a back and forth fashion around any of the single scrolling command thresholds. The reluctance boundaries provide the necessary tactile feedback to inform the operator about the extent of the lower reluctance zone in which single-step operation is provided. When the operator desires to perform a longer scroll, he or she may do it by displacing the knob 41 until it reaches any of sub-zones A3, therefore starting an automatic generation of incremental scrolling commands at a rate related to the extent the knob displacement has overpassed any of the reluctance boundaries 106.

Figure 5:
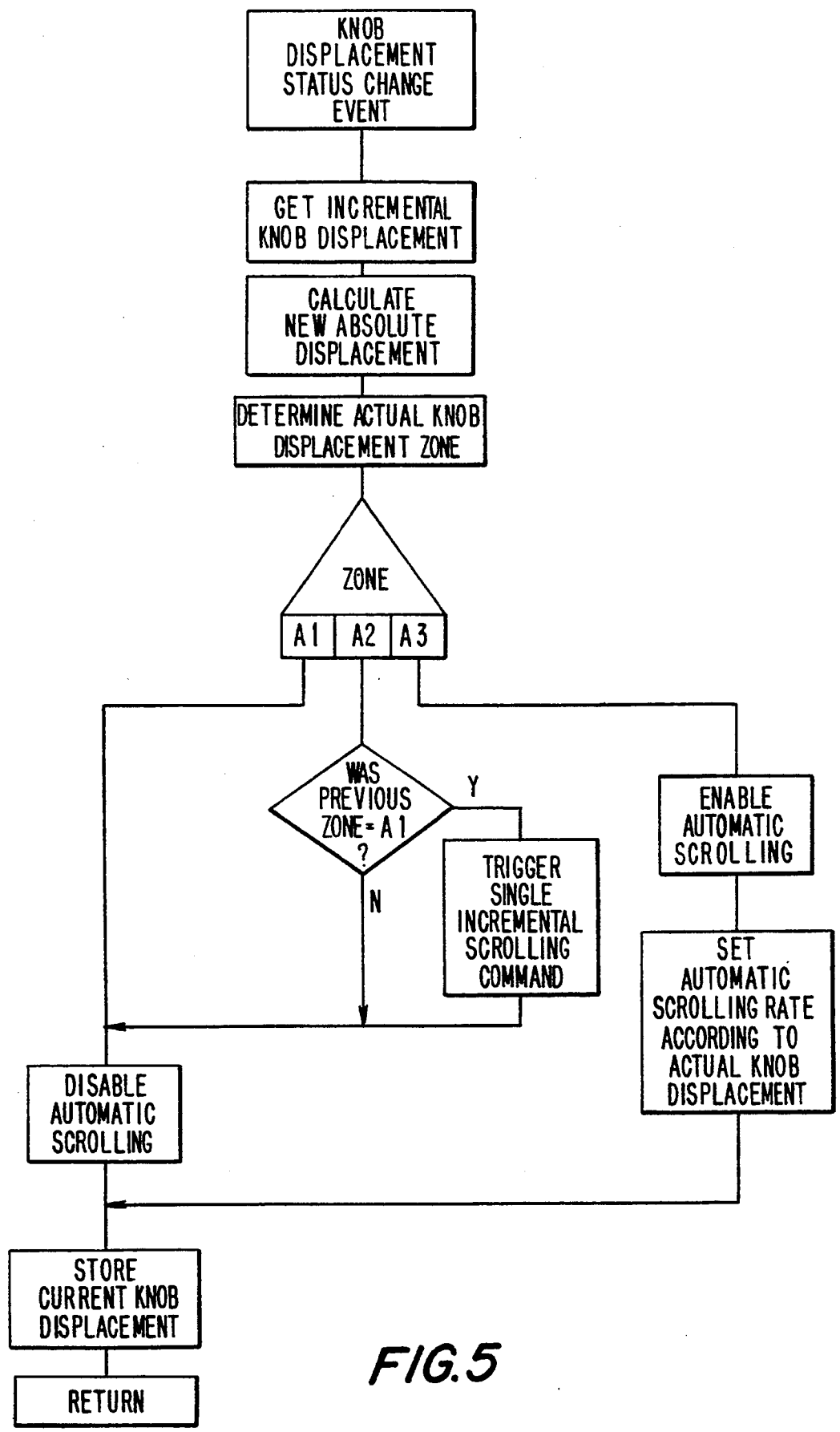
FIG. 5 is a flow diagram representing the operational method of the supplementary control means.

A flow diagram of a routine realizing the method disclosed above is shown in FIG. 5. It will be apparent to those skilled in the art that the functions represented in the flow diagram of FIG. 5 can be realized by processing means residing inside the computer or alternatively inside the mouse housing, or any other combination. However, the first case is preferred since it is likely to reduce the mouse overall cost.

The physical characteristics of the improved scrolling mouse of this invention and the way the supplementary control signals generated by supplementary control means 40 are interpreted is disclosed herein above. It will be apparent to those skilled in the art that although a conventional rolling-sphere type mouse embodiment is used to exemplify the invention, the concepts disclosed have general application in many types of x-y pointing devices used in the computer industry (e.g., a trackball having the scrolling features disclosed is basically the mouse 10 put upside-down).

Following is the disclosure of the method regarding interpretation of the dynamic evolution of the x-y and binary signals generated by mouse 10, signals that are also generated by a conventional mouse.

As stated before, the original method for issuing scrolling commands to a computer using a scrolling mouse is based on moving the mouse from an arbitrary cursor position in such a way as to approximately define a cursor trail pattern recognizable by a computer program, for dynamically selecting a scrolling axis and starting a scrolling operation in the selected axis by operating knob 41. In the preferred embodiment of the original method described in the parent application, there are three patterns defined (i.e., a horizontal line, a. vertical line and a circle), each of them assigned to a different scrolling axis (i.e., "x", "y" and "z" axis), so that detection of any predefined pattern directly updates a scrolling axis status variable, which can be set to any of the available options.

In the improved method of the invention, a step is added to enhance flexibility and speed while performing scrolling operations. The added step provides detection of a separate predefined pattern to set the scrolling scale (i.e., the amount of scrolling performed by each incremental scrolling command issued to an application program). In the preferred embodiment of the improved method, both linear patterns (i.e., horizontal and vertical cursor movements) are assigned to set the scrolling axis as in the original method, while the circular pattern is assigned to change the scrolling scale.

Figure 6A:
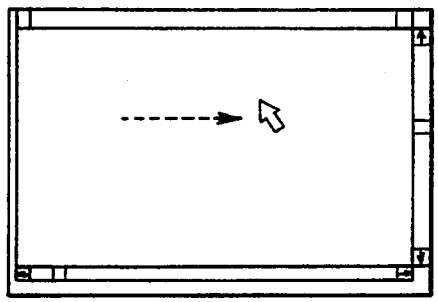
FIGS. 6a-6f illustrate a method of using the mouse according to the invention and are diagrammatic views of successive logic windows in a display means, illustrating how the mouse is operated.
Figure 6B:
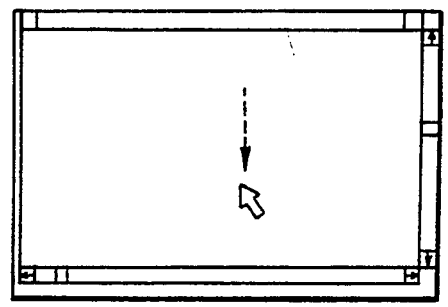
Figure 6C:
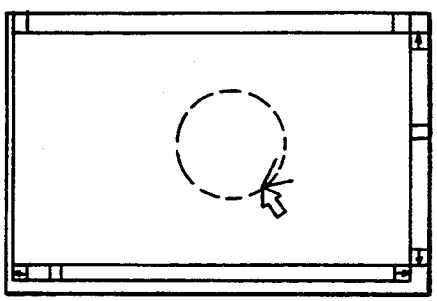

The improved method is sketched in FIGS. 6a through 6f, which represent consecutive diagrammatic views of a logic window, in a visual display generated by a computer operated by mouse 10. In FIG. 6a, an approximately horizontal motion is issued to the cursor to set the scrolling axis status variable to "x". As soon as the dominant axis is detected by the computer program, the operator can start scrolling concurrently in that direction to reach the desired data field in the least time possible, as it is explained in the parent application in relation to the original method. In FIG. 6b, an approximately vertical motion is issued to the cursor to set the scrolling axis status variable to "y". In FIG. 6c, an approximately circular motion is issued to the cursor to change the scrolling scale status variable to "page-scale" (assuming the default scale is "line-scale").

Figure 6D:
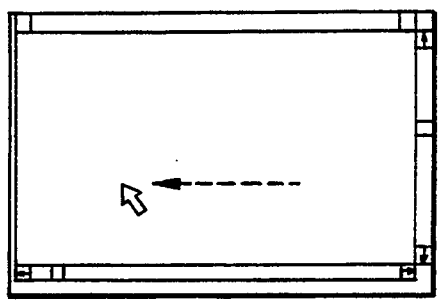
Figure 6E:
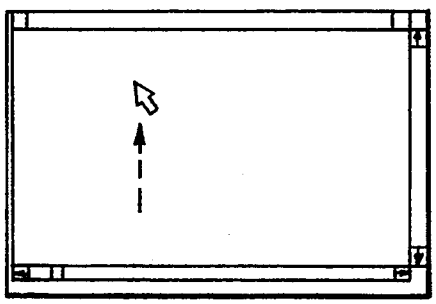
Figure 6F:
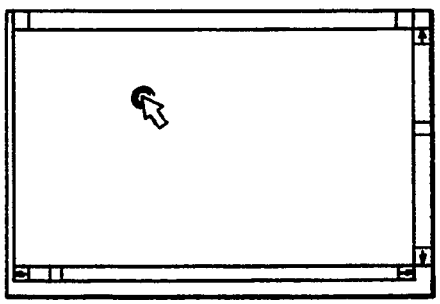

Immediately afterwards, an approximately horizontal motion is issued to the cursor in FIG. 6d, to set the scrolling axis status variable again to "x" but now the scrolling scale is "page-scale", so each incremental scrolling command generated will perform a whole page scrolling in a direction parallel to the "x" axis. In FIG. 6e, the scrolling axis is set again to "y" while the scrolling scale is still in "page-scale". In FIG. 6f, a mouse button is pressed, what resets the scrolling scale back to "line-scale", and the sequence may start again.

Moreover, since linear patterns and circular patterns alter independent scrolling attributes and since circular patterns are memorized once detected, they can be mixed or combined to perform more complex scrolling commands (dynamic scrolling commands), in which scrolling scale settings and scrolling axis settings are performed in a single cursor movement. This is shown in FIGS. 7a through 7f, which are examples of dynamic scrolling commands detected on mouse movement, according to the method of the invention.

Figure 7A:
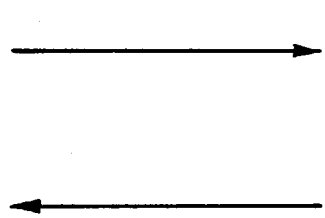
FIGS. 7a-7f illustrate possible dynamic scrolling commands according to the method of the invention.
Figure 7B:
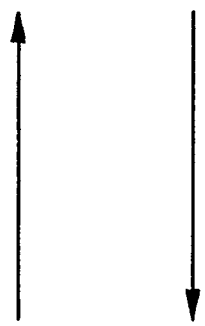
Figure 7C:
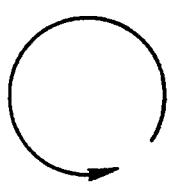
Figure 7D:
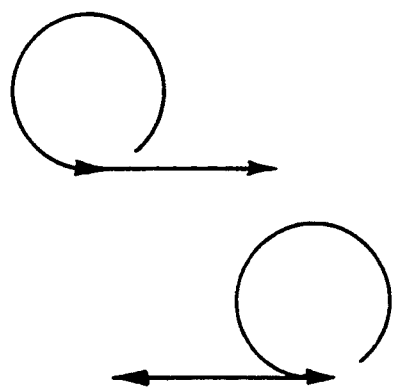
Figure 7E:
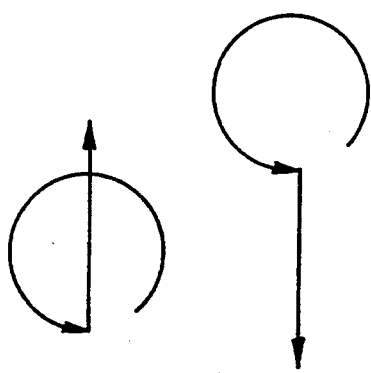
Figure 7F:
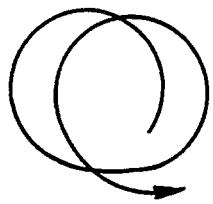

FIG. 7a sketches two isolated horizontal linear mouse motions, any of which result independently in setting the scrolling axis status variable to "x". FIG. 7b sketches two isolated vertical linear mouse motions, any of which result independently in setting the scrolling axis status variable to "y". FIG. 7c sketches an isolated circular mouse movement, which results in a change of the scrolling scale status variable. For example, if the scrolling scale status variable was set to "line-scale" before the pattern of FIG. 7c is detected, after the pattern detection it will be set to "page-scale" and each incremental scrolling command triggered by mouse 10 will generate a whole-page scrolling of the displayed image. FIG. 7d sketches an example of a combined dynamic scrolling command, comprising a circular movement followed by a linear horizontal movement. Any of these pattern combinations are interpreted as complex commands to upgrade the scrolling scale (e.g., to "page-scale") and set the scrolling axis to "x" in one cursor movement. FIG. 7e sketches dynamic scrolling commands analogous to the ones of FIG. 7d, in this case setting the scrolling axis to "y". In FIG. 7f, two consecutive circular patterns are chained. In the preferred embodiment of the method, this combination is used to set the scrolling scale to "layer-scale" (i.e., scrolling in or out the screen plane between successive 3D data layers).

Figure 8:
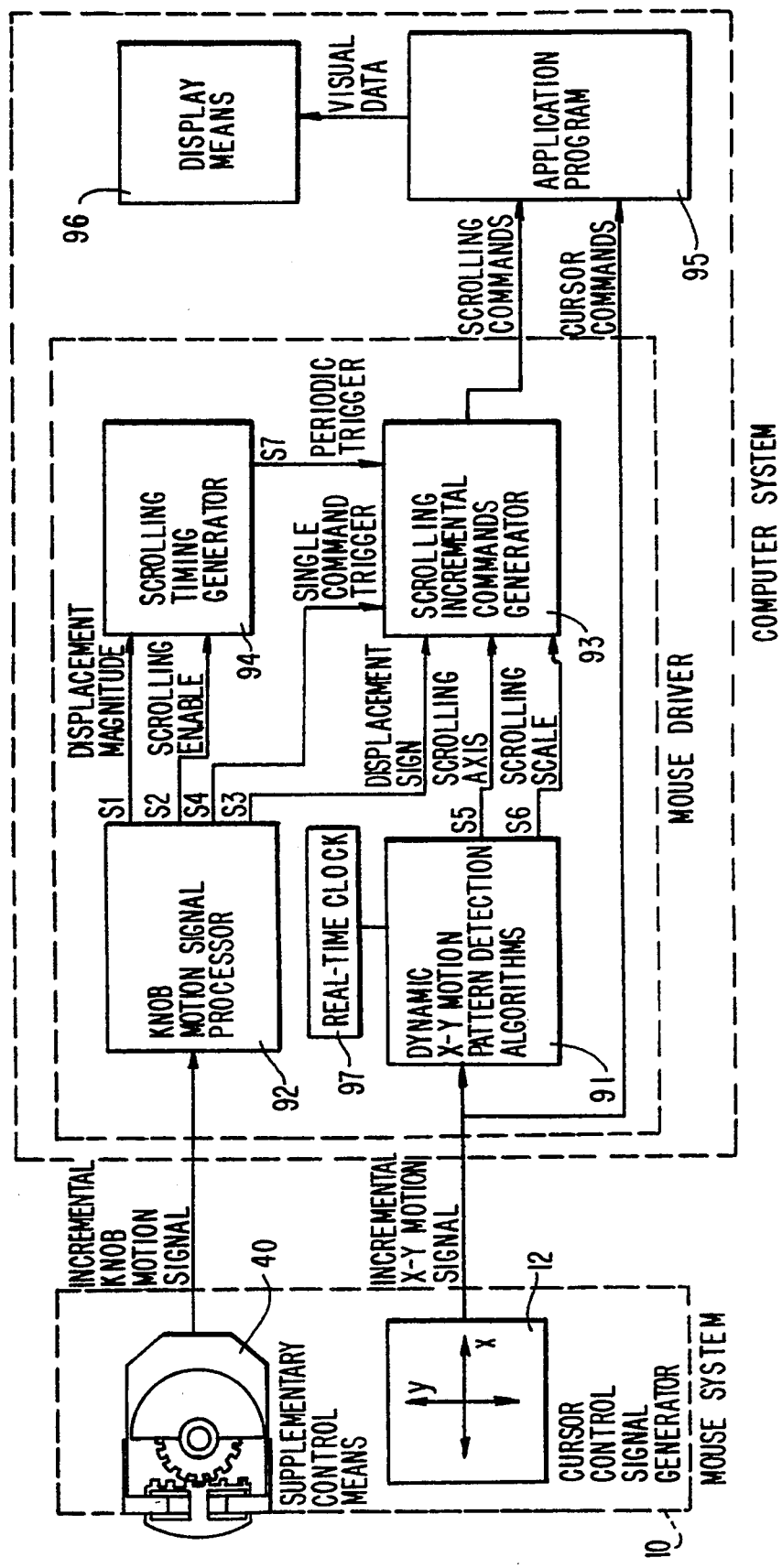
FIG. 8 is a block diagram of a computer system using the mouse of FIG. 1a according to the invention.

FIG. 8 is a block diagram of a computer system using the mouse and method of the present invention, reflecting the modifications done on the analogous diagram of the parent application (FIG. 6 of the parent application). As for the original mouse and method, a special mouse driver arrangement is used to translate the signals generated by mouse 10 into scrolling commands and cursor movement commands.

In FIG. 8, the signal generated by the supplementary control means 40 is transmitted to the computer and processed by processing circuit means 92, which comprises software routines for calculating the actual knob position out of the incremental motion signals generated by transducer 43. Circuit means 92 also performs the functions represented by the flow diagram of FIG. 5, generating four outputs: a first output S1, representative of the knob displacement magnitude; a second output S2, which is a flag signal indicating when the knob has overpassed the reluctance boundaries 106 and is used as an automatic scrolling enable signal; a third output S3, which is a flag signal representing the sign of the knob displacement relative to its equilibrium position; plus, a fourth output S4, which is a trigger signal generated each time the knob displacement crosses the single command threshold 104, according to what is explained herein before in relation to the operation of the supplementary control means 40.

The output S1 is fed to a scrolling timing generator circuit means 94, which produces a periodic signal used as a trigger for the generation of incremental scrolling commands. The output S2 is also fed to circuit means 94 for enabling the generation of incremental scrolling commands, only while knob 41 is in the high reluctance zone A3. The output S3 conveys the scrolling direction within the selected axis and is fed directly into a scrolling incremental command generator circuit means 93. The scrolling timing generator circuit means 94 comprises a hardware/software timer for generating periodic signals to trigger the incremental scrolling commands issued to an application program 95, at a variable rate under user control. These scrolling commands are transferred to the application program 95 through a suitable software path, and by similar means as the cursor control commands.

On the other hand, the x-y signals generated by the mouse x-y transducer 12 are by-passed to the application program for controlling the cursor movement as it is usually done. A copy of these signals is input to processing circuit means 91 which contains software algorithms for detecting the predefined patterns in the cursor trail as it moves over display means 96. Processing circuit means 91 generates two outputs: a first output S5, representing the value of the scrolling axis status variable; plus, a second output S6, representing the value of the scrolling scale status variable. Both status variables are kept by processing circuit means 91 and are dynamically updated at each real-time event generated by real time clock means 97, so that they reflect the information captured in the immediate past history of the cursor movement.

The scrolling incremental commands generator 93 includes software routines that generate the corresponding incremental commands upon receipt of the scrolling strobes generated by either scrolling timing generator circuit means 94 (for autonomous variable rate scrolling) or processing circuit means 92 (for step-by-step scrolling), as explained herein before. The particular incremental scrolling command generated by incremental commands generator 93 is dependent on the combined values of the scrolling axis status variable and the scrolling scale status variable generated by circuit means 91, plus the displacement sign variable generated by circuit means 92. The output generated by incremental scrolling commands generator 93 is linked to the available incremental scrolling routines of the application program to generate the corresponding visual effect on the computer's screen. It will be apparent to those skilled in the art that this can be done through a variety of hardware/software techniques known in the art (e.g., a straight forward and compatible approach is through emulation of keyboard keys assigned to scrolling functions).

The output of the incremental scrolling commands generator means 93 as a result of its input is summarized in the following Table I.

TABLE I

| INPUT | | | OUTPUT |
|---|---|---|---|
| Scrolling Axis | Displacement Sign | Scrolling Scale | Incremental Scrolling Command |
| x | + | Line | Line Right |
| x | − | Line | Line Left |
| Y | + | Line | Line Up |
| Y | − | Line | Line Down |
| x | + | Page | Page Right |
| x | − | Page | Page Left |
| Y | + | Page | Page Up |
| Y | − | Page | Page Down |

It will be apparent to those skilled in the art that all functions performed by the elements present in the mouse driver arrangement of FIG. 8 can be realized through a number of alternative embodiments comprising hardware means and/or software routines widely known in the art. The only exception are the algorithms contained in processing circuit means 91 for detecting the predefined patterns, which are discussed hereinbelow.

As explained in the parent application in relation to the original method, the algorithms used for detecting pre-defined patterns in the cursor trail are based on sampling consecutive cursor positions at a fixed rate, and storing the x-y information in a two-dimensional shift register data structure, to keep track of the cursor trail as it is moved on the display means. For that purpose, the system must include a real-time clock means to synchronize the sampling process. Since the algorithms are based on analyzing backwards in time the relative cursor positions considering the last cursor position as the origin, only incremental translation information is stored in the shift register. At each mouse input event, circuit means 91 inputs the incremental x-y motion information generated by mouse 10 and adds it in an x-y accumulator provided thereto. At the following real-time event, the contents of the accumulator are stored in the head position of the shift register, clearing then the accumulator to begin a new count. Hence, the contents of the accumulator represent the incremental x-y motion information generated by the mouse movement between two consecutive real-time events. The information stored in the tail of the shift register is then discarded, and the corresponding pointers are updated. The information stored in the shift register is then analyzed to detect pre-defined patterns to be interpreted as scrolling axis settings and scrolling scale settings.

Figure 9:
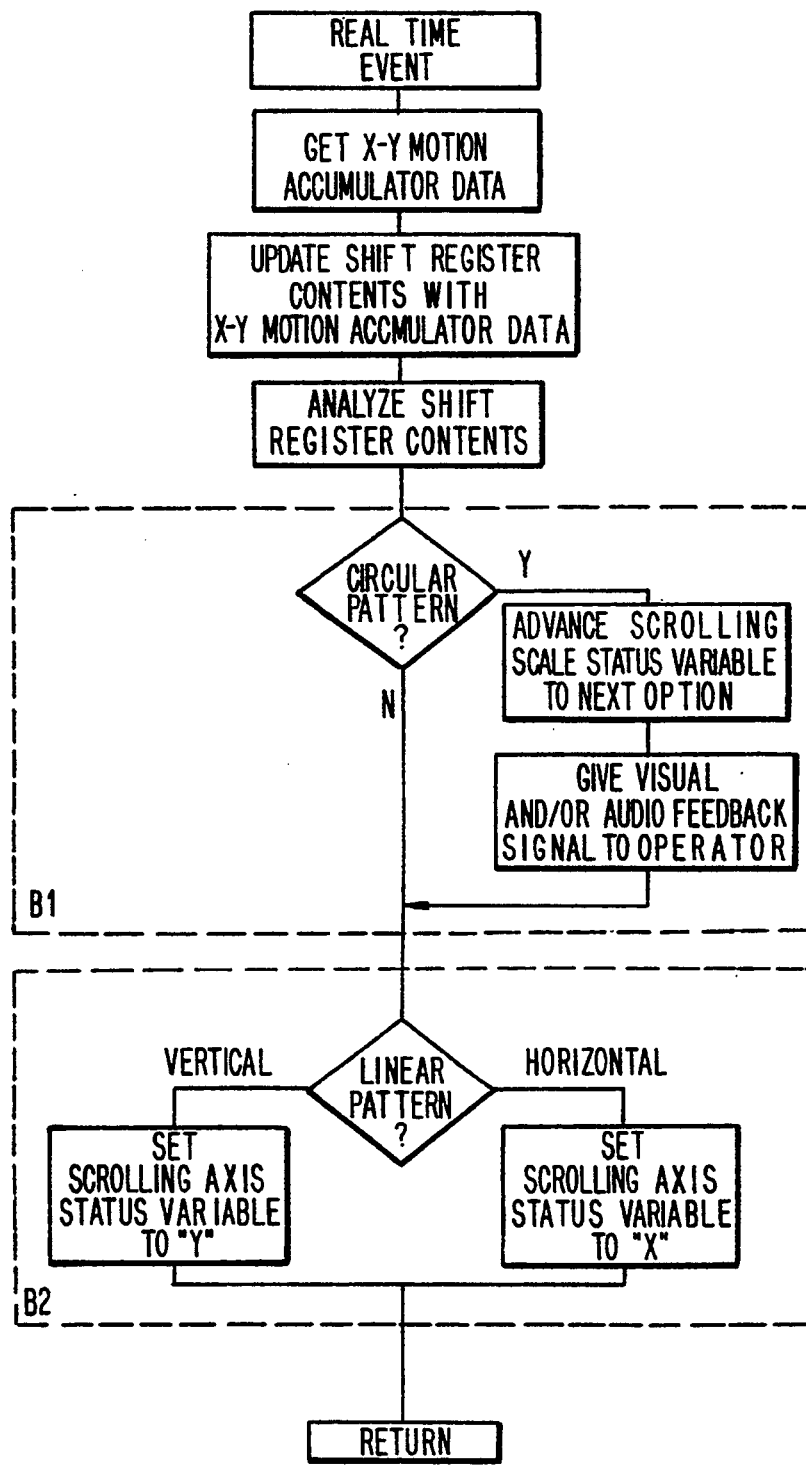
FIG. 9 is a flow diagram of a routine realizing the associated method of the invention.

A flow diagram of a program realizing the improved method of the invention is shown in FIG. 9. As can be seen in the flow diagram of FIG. 9, the flow corresponding to the detection of circular patterns is delimited by block B1 and affects the value of the scrolling scale status variable, while the flow corresponding to the detection of linear patterns is delimited by block B2 and affects the value of the scrolling axis status variable. Both status variables are updated independently and simultaneously (i.e., in the same real-time event).

Figure 10:
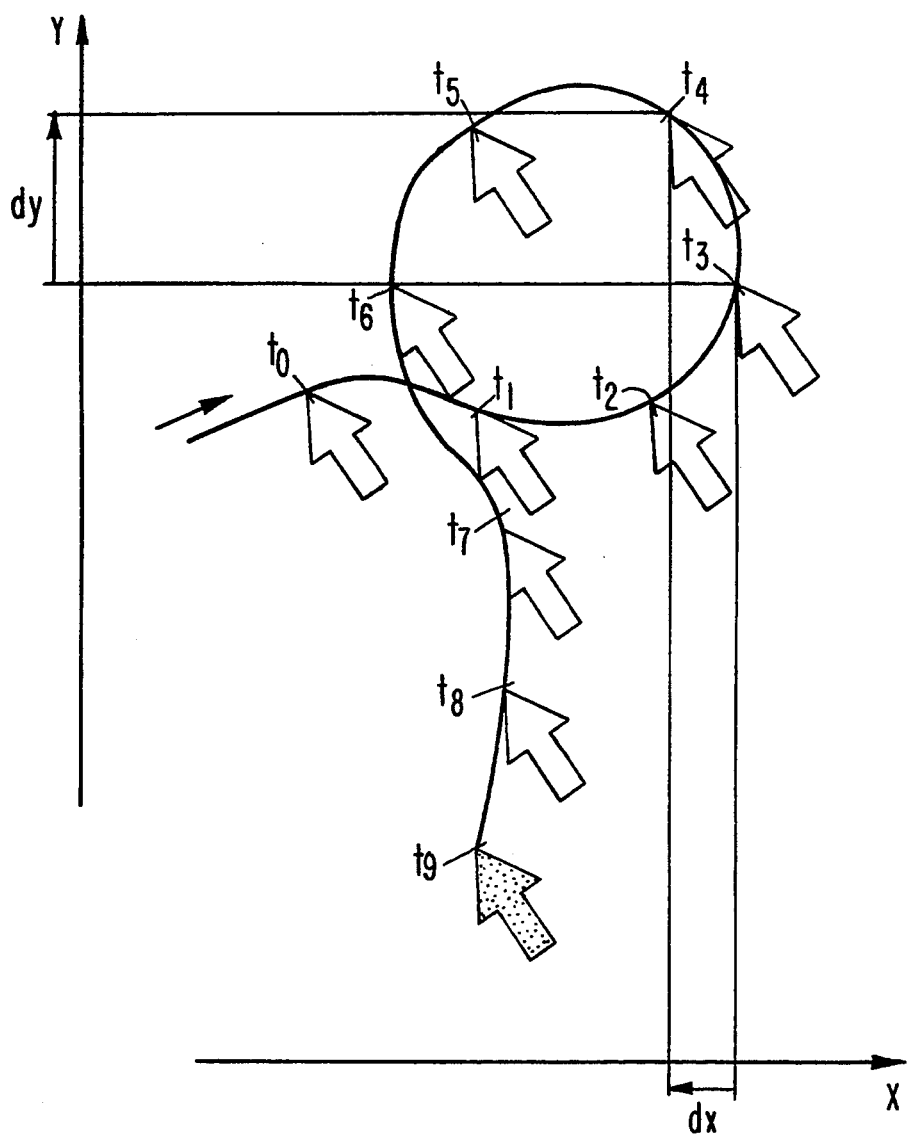
FIG. 10 is an x-y diagram showing an examples of cursor trajectory and its consecutive cursor positions.

FIG. 10 shows a possible cursor trajectory to illustrate how the flow diagram of FIG. 9 works. A plurality, of successive cursor positions are shown at corresponding real-time events represented as marks t0 through t9.

At each real-time event the cursor trail. is analyzed and a match with a circular pattern is first tried. Upon a match, the corresponding status variable (i.e., the scrolling scale status variable) is updated accordingly. At the same real-time event, the same cursor trail information is then analyzed to detect a linear pattern (i.e., horizontal or vertical movement) and the corresponding status variable is altered accordingly (i.e., the scrolling axis status variable). Therefore, assuming for example that the scrolling scale status variable is set to "line-scale" at time t0 in FIG. 9, the circular pattern is detected approximately at real-time event t6 or t7, and memorized in the scrolling scale status variable, which is advanced to "page-scale". Although the scrolling axis is set at each real-time event as has been explained, it has a useful meaning only at 28 time t9, where it will be set to "y", according to the dominant axis of the last part of the cursor trajectory. At that point, actuation of knob 41 will produce a vertical scrolling on a page basis, upwards or downwards depending on the sign of the knob displacement. In this way, although both status variables are altered independently, looking backwards from t9, the cursor trajectory shown in FIG. 10 looks like a complex command consisting of a circular pattern followed by a linear vertical pattern. Hence, from the operator's standpoint, this complex cursor trajectory is equivalent to a combined command to set the scrolling scale to "page-scale" and set the scrolling axis to "y", in a single mouse movement. However, the pattern detection algorithms are kept simple, since they only have to discriminate a vertical line from a horizontal one, or the existence of a circular movement, one independently of the other. Therefore, a richer and more flexible language is obtained between operator and computer, but with no sacrifice in simplicity of the pattern detection algorithms.

In the same way, if scrolling in the "z" axis is used, two consecutive circular patterns are assigned to select this scrolling scale option. For this purpose,, three options are available for the scrolling scale status variable which is advanced to the next option whenever a circular pattern is detected. While the scrolling scale is set to "layer-scale", the scrolling axis status variable is ignored, since it should be fixed to the "z" axis, so only the displacement sign is used to determine the scrolling heading (i.e., in or out of the screen plane). Since the pattern detection is performed at each real-time event, the shift register contents must be cleared as soon as a circular pattern is detected to avoid double detection of the same circular pattern in consecutive real-time events. As explained before, whenever a mouse button is activated the scrolling scale is reset to its default option (e.g., "line-scale").

The algorithms used to detect both type of patterns in the realization of improved method are similar to those disclosed in the parent application and are also based on calculation of four parameters from the contents of the shift register. Following is the list of the four parameters disclosed in the parent application and their definition:

sadx: sum of the absolute values of the shift register contents along the "x" axis;

sady: sum of the absolute values of the shift register contents along the "y" axis;

asdx: absolute value of the sum of the shift register contents along the "x" axis;

asdy: absolute value of the sum of the shift register contents along the "y" axis.

For the two linear patterns corresponding to the scrolling axis settings, the algorithms are simply based on comparing the magnitudes of asdx and asdy and setting the scrolling axis according to the greater of both, since there are only two possibilities, as disclosed in the parent application.

In the realization of the improved method, however, two additional parameters are defined to improve circular pattern detection; the pattern length and the pattern size.

The length of a pattern is defined as the number of consecutive real time events in which significant x-y mouse data has been entered in the shift register. According to the definition, a pattern length counter is obtained if the contents of a variable is incremented in each real-time event in which significant mouse movement is detected. When a real-time event takes place and no significant x-y mouse movement has been detected, the pattern length counter is reset to zero. Thus, the pattern length counter is a measure of the time used to "draw" the pattern.

On the other hand, the size of a pattern is defined as the total physical distance tripped by the cursor in either axis to draw the pattern in the display means screen. Thus, the size of a pattern can be obtained as the absolute value of the sum of all incremental distance units the cursor has been moved in either axis, in each real-time event in which the pattern length counter was incremented.

Since circular patterns tend to have a greater length than linear patterns (approximately by a $\pi$ factor), it is helpful to vary the analyzed extent of the shift register contents to provide a more accurate detection of scrolling axis commands and scrolling scale commands. When analyzing the shift register contents, the pattern length counter is compared to a pre-defined pattern length threshold, so as to adjust the extent over which the shift register contents are analyzed.

Figure 11:
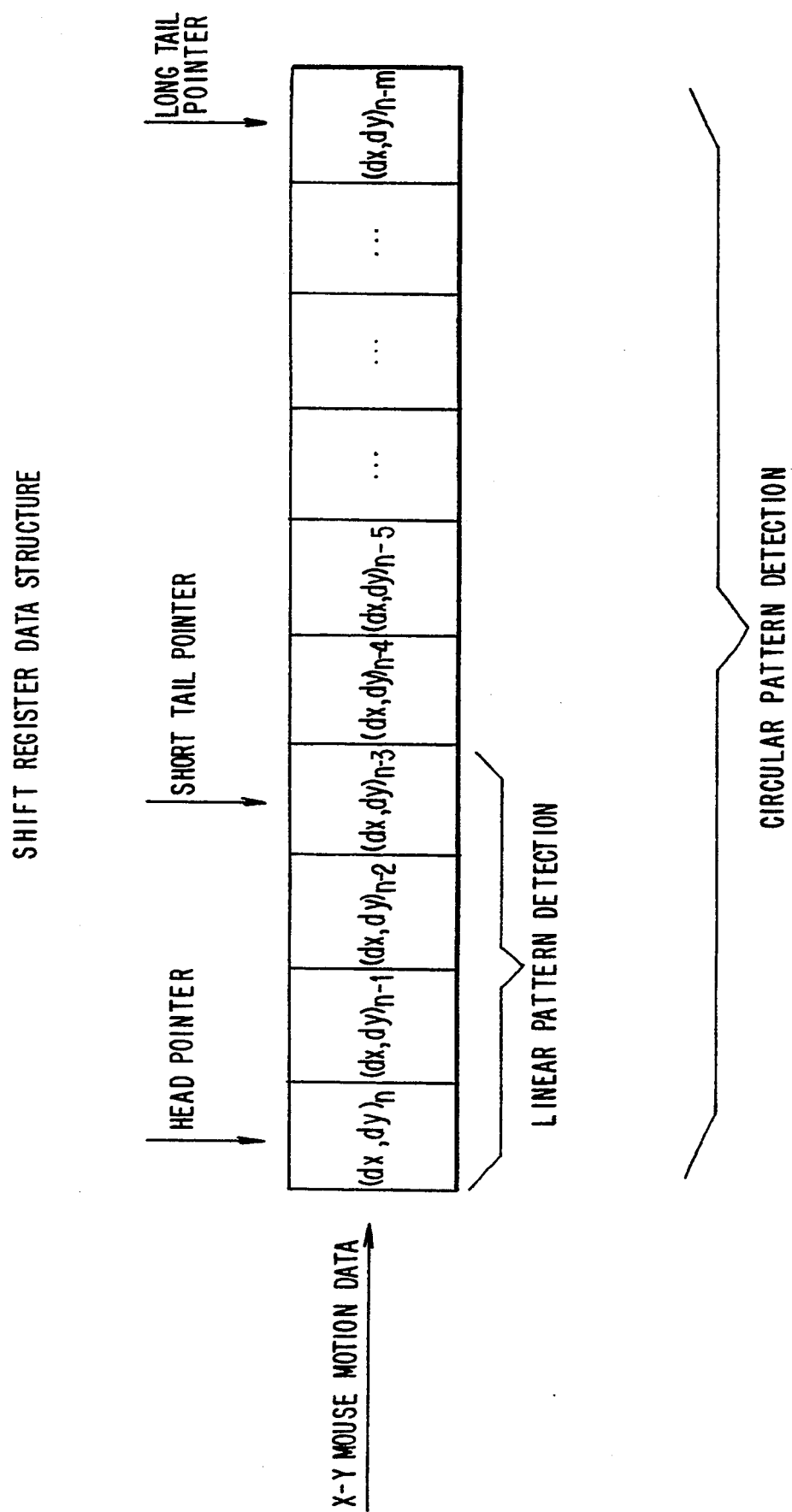
FIG. 11 is a diagrammatic representation of a shift register data structure as the one used for realizing the method of the invention.

This technique is sketched in FIG. 11, which is a diagrammatic representation of a shift register data structure as one used in the implementation of the method of the invention. In said representation, at each real-time event the x-y mouse motion data enters the shift register by its right side as $(dx,dy)_n$, and moves inside the shift register through its m stages until it reaches the left side $(dx,dy)_{n-m}$, to be then discarded.

As shown in FIG. 11, the shift register is divided into two parts corresponding to short and long patterns. The division is accomplished by maintaining one head pointer and two synchronized tail pointers at different distances from the head pointer, as shown in FIG. 11. In other words, at each real-time event, the head pointer and both tail pointers are advanced to the next stage, keeping always the same distance between each other. Two sets of parameters are then calculated: sadx-s, asdx-s, sady-s and asdy-s for the short case and: sadx-1, asdx-1, sady-1 and asdy-1 for the long case. The long case parameters are used for circular pattern detection whereas the short case parameters are used for linear pattern detection.

Furthermore, mouse operators tend to produce unintentional small mouse movements in normal operation, that might be accidentally detected as circular pattern commands. Therefore, in order to differentiate valid cursor movement commands from a number of scattered meaningless cursor movements, pattern length and size conditions are implemented in the algorithms. In this way, movements with less than a pre-determined length threshold and a pre-determined size threshold are filtered. Since circular patterns are useful only if they are drawn in a certain period of time and have at least a certain size, unintentional movements can be avoided by filtering small and short movements.

With all these considerations, the criteria used for detecting circular patterns can be summarized in the following inequalities:

1: pattern-length > minimum-length
2: pattern-size > minimum-size
3: asdx-1 * k1 < sadx-1
4: asdy-1 * k1 < sady-1
5: sadx-1 < sady-1 * k2
6: sady-1 < sadx-1 * k2

Inequalities 1 and 2 filter all patterns but those which have at least an adequate size and are drawn in just one movement (i.e., without interruptions).

Inequality 3 filters all movements but those in which the final distance between the starting and ending point along the "x" axis is at least k1 times smaller than the whole distance tripped by the cursor along the same axis.

Inequality 4 is analogous to inequality 3 but for the "y" axis.

Inequality 5 filters all movements but those in which the whole distance tripped by the cursor along the "x" axis is at most k2 times greater that the overall distance tripped by the cursor along the "y" axis (quadrature condition).

Inequality 6 is the dual of inequality 5 for the "y" axis.

An approximately circular movement will satisfy all inequalities 1 through 6. If a more close detection is desired, additional conditions may be added. However, the advantage of the circle detection algorithms disclosed is that they require minimum computing power for their implementation, since only sum and substraction operations are needed. In practice, the disclosed criteria combined with the following parameter settings have proven to be effective:

| Constants: | |
|---|---|
| k1: | 2 |
| k2: | 2 |
| Shift Register Size: | |
| Long: | 8 stages |
| Short: | 3 stages |
| Real-time Clock Frequency: | 18.2 ms |
| Pattern Length Threshold: | 7 real-time events |
| Pattern Size Threshold: | 10 cm |
| Minimum Meaningful Mouse Movement: | 0.5 cm |

Figure 12A:
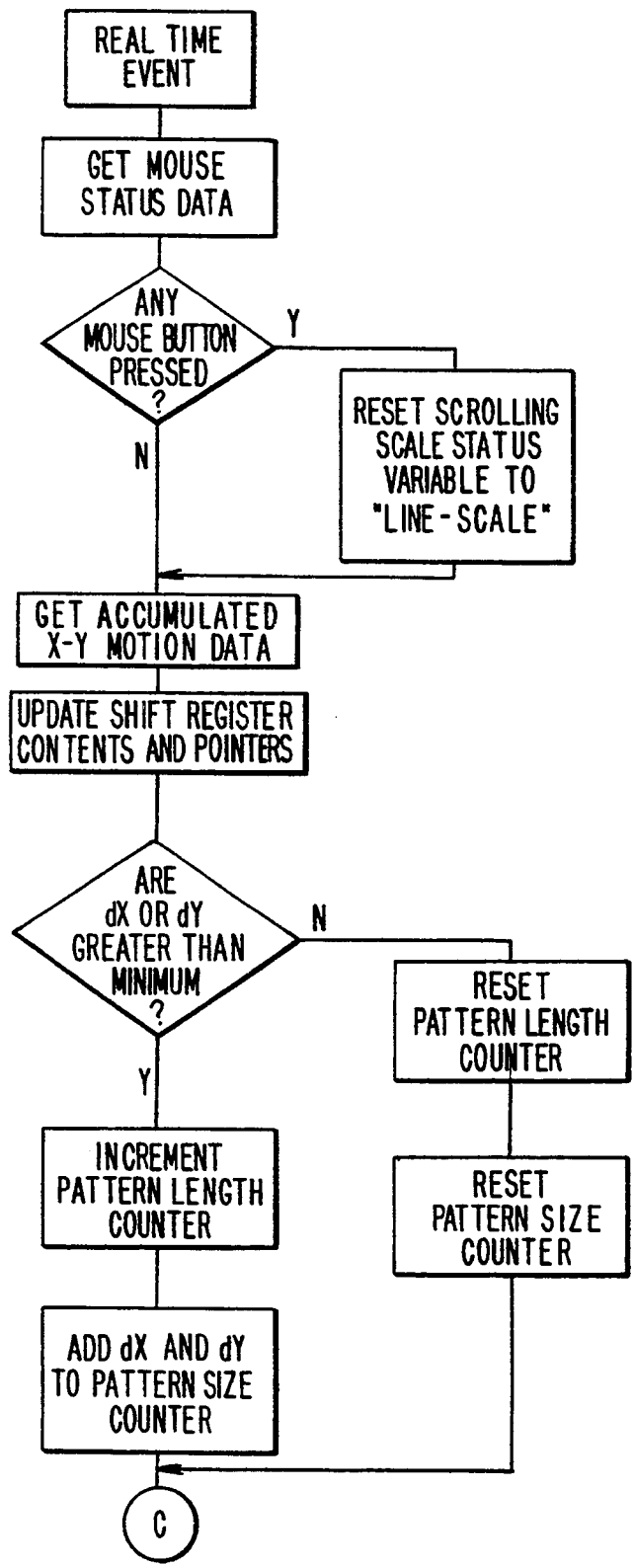
FIGS. 12a and 12b is a flow chart of the pre-defined pattern detection algorithms in a realization of the method according to this invention.
Figure 12B:
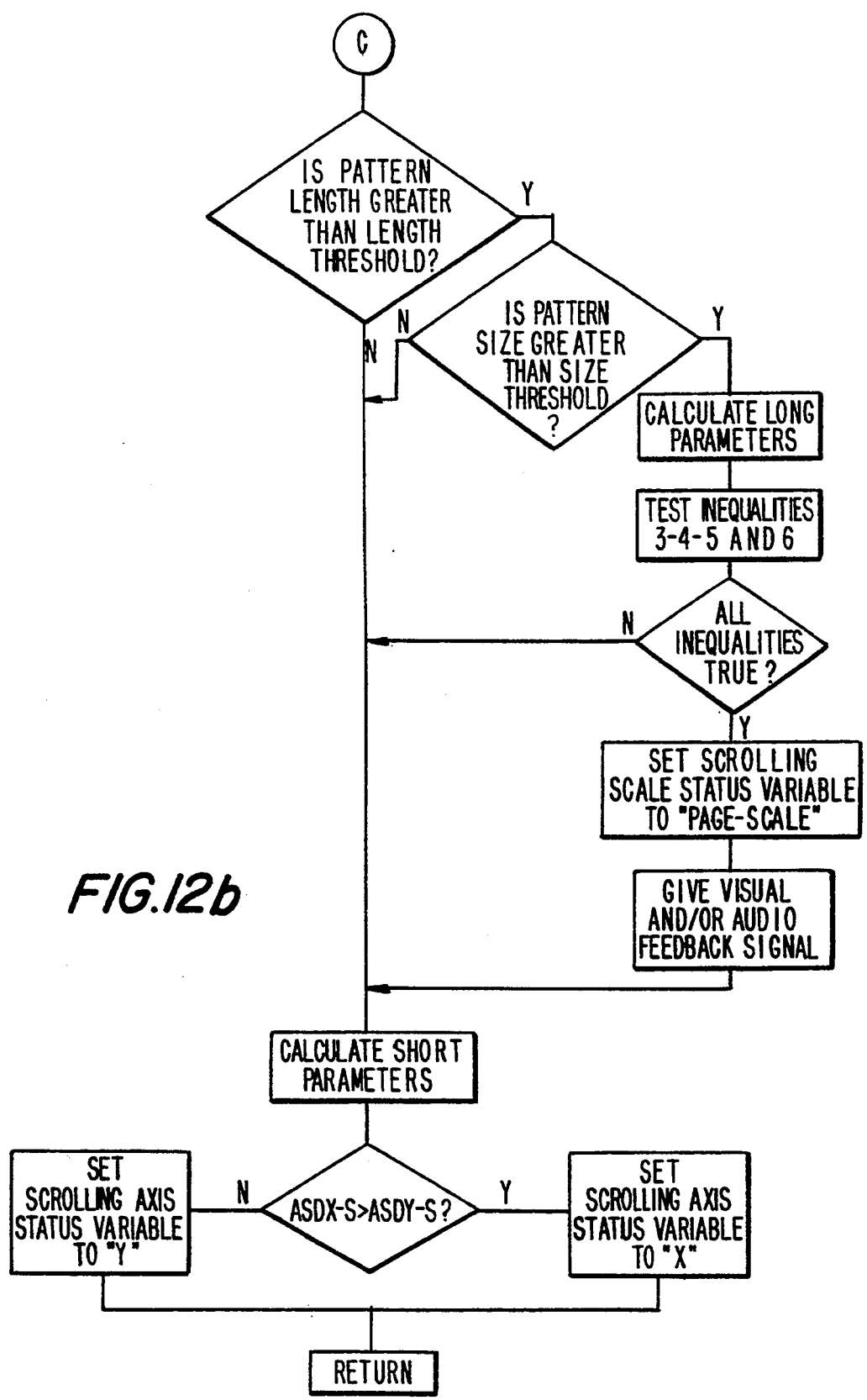

FIGS. 12a and 12b are a flow diagram of the pattern detection routines summarizing what has been explained in relation with the pattern detection algorithms.

Thus, combining the structural characteristics of the mouse 10 of the invention with the method disclosed, scrolling can be performed in different scales, along different axis and at a plurality of speeds, using only one finger of the hand that holds and moves the mouse. This allows the mouse 10 of the invention to be used as a virtual pointing device, not bounded by the physical screen limits, but still compatible with conventional mouse usage methods and applications.

The advantage of the pattern set used (i.e., a linear horizontal mouse motion, a linear vertical mouse motion and a circular mouse motion) and the pattern-to-command assignment disclosed herein, is that all patterns are easily associated to the effect they produce on the display. In other words, a linear pattern can be intuitively associated to a gesture or sign to tell the computer that a scrolling direction parallel to that of the linear pattern is desired, while a circular pattern can be intuitively associated to a gesture to tell the computer that a scrolling scale altering the whole screen or window contents is desired. Moreover, since the gesture language is composed of only three elements that can be combined, the detection of each of the individual elements can be performed with great flexibility, allowing to provide a highly humanized and novel computer-user interface.

While the invention has been illustrated and embodied in a mouse with supplementary control means and associated method for concurrent scrolling and cursor control, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Mouse for interactive operation of a computer, said computer having display means for displaying information entities to an operator of said computer, said mouse comprising:
a first transducer means for generating x-y position signals for controlling movement of a cursor on said display means to point to said information entities in response to movement of said first transducer means by a hand of an operator, and
supplementary control means including a second transducer means for generating supplementary control signals for controlling scrolling operations for moving said information entities displayed on said display means, said second transducer means including a displaceable body and a spring-loaded mechanism connected to said displaceable body, so that said displaceable body is urged into an initial equilibrium position by said spring-loaded mechanism but is displaceable from said equilibrium position in either of two directions by a digit of said hand of said user against a reluctance provided by said spring-loaded mechanism, said spring-loaded mechanism structured so that said reluctance varies between a first reluctance level and a second reluctance level at a displacement threshold of said displaceable body, so as to provide to said operator in said digit of said hand a tactile feedback about position of said displaceable body relative to said displacement threshold, said second transducer means being structured so that said supplementary control signals convey information about a displacement amount and a displacement direction of said body from said equilibrium position, so that said information entities on said display means can be moved at a variable rate determined by said displacement amount and in a direction according to said displacement direction.

2. Mouse as defined in claim 1, further comprising a housing and wherein said displaceable body comprises a knob that can be slid along a substantially linear path provided by rail means mounted at a side of said housing, so that said knob is easily operable by a thumb of said hand of said operator while said mouse is operated.

3. Mouse as defined in claim 2, wherein said second transducer means further includes a movable part rotatably mounted on a pivot axle on said housing, said movable part being mechanically engaged with said knob so that said movable part rotates when said knob is displaced from said equilibrium position in either of said two directions and said spring-loaded mechanism comprises a first spring element including a first resilient wire wound around said pivot axle forming a first pair of V-arms and held in place by a pair of stops fixed to said movable part, said first pair of V-arms abutting against first stationary stops provided in said housing to urge said body through said movable part toward said initial equilibrium position, and a second spring element comprising a second resilient wire wound around said pivot axle forming a second pair of V-arms abutting against second stationary stops provided in said housing to urge said body through said movable part toward said initial equilibrium position;

wherein said first and second pairs of stops are positioned and said first and second spring elements are tensioned so that said first spring element provides said first reluctance level and said first and second spring elements provide said second reluctance level during displacement of said body beyond said displacement threshold.

4. Mouse as defined in claim 3, further comprising a baseboard and a printed circuit board including logic circuit means, said baseboard being affixed to said printed circuit board and said pivot axle, said first and second stationary stops and said rail means being attached to said baseboard so as to simplify assembly and minimize tolerances.

5. Mouse as defined in claim 4, wherein said movable part is an approximately semicircular part having an internal slotted skirt coaxial to said pivot axle, and said baseboard having openings through which two opto-couplers are mounted on said printed circuit board and electrically connected thereto, each of said opto-couplers consisting of a light source and a light detector, and said baseboard also having a complementary fixed skirt portion coaxial to said pivot axle provided with two complementary fixed slots spaced from each other and positioned between said light detectors and said light sources so as to alternately block and pass light from said light sources to said light detectors, said logic circuit means generating a digital position signal indicative rotational position of said movable part according to said displacement amount and said displacement sign.

6. Method of operating a computer in an interactive manner, said computer including a display means for displaying information entities to an operator, a mouse connected to said computer, said mouse comprising means for generating x-y incremental movement information for positioning a cursor for pointing to said information entities, binary control means for generating binary control commands for said computer, supplementary control means for generating a supplementary control signal of a variable sign and a variable magnitude under control of said operator, and communication means for transmitting said movement information, said binary control information and said supplementary control signal to said computer; and programmable circuit means for generating said information entities displayed in said display means;

said method comprising generating incremental scrolling commands from said supplementary control signal for moving said information entities on said display means by operation of said supplementary control means by said operator, said method including the steps of:

a) analyzing a trail of said cursor at periodic time intervals;

b) dynamically setting a first status variable to a scrolling axis option according to a dominant axis of said cursor trail at said time intervals;

c) dynamically setting a second status variable to a scrolling scale option upon detection of an approximately circular cursor trail pattern at said time intervals;

d) generating incremental scrolling commands for scrolling said information entities in a scrolling direction along said scrolling axis option determined in step b) according to a sign of said supplementary control signal and in said scrolling scale option.

7. Method as defined in claim 6, wherein said axis option options include an up-down option and a left-right option, and said scrolling scale options include a lower scrolling scale option and a higher scrolling scale option.

8. Method as defined in claim 7, further comprising the step of scrolling said information entities along said scrolling axis option and in said scrolling scale option at a plurality of scrolling modes depending on said magnitude of said supplementary control signal.

9. Method as defined in claim 8, wherein said plurality of scrolling modes includes a single-step mode comprising generation of a single incremental scrolling command when said magnitude of said supplementary control signal crosses a first pre-determined magnitude threshold and only when said magnitude is growing from a lower value to a higher value.

10. Method as defined in claim 9, wherein said plurality of scrolling modes further includes a autonomous variable rate mode comprising automatic generation of incremental scrolling commands when said magnitude of said supplementary control signal is larger that a second pre-determined magnitude threshold, said rate being determined by said magnitude.

11. Method for operating a computer in an interactive manner, said computer including a display means for displaying information entities to an operator, a mouse connected to said computer, said mouse comprising means for generating x-y incremental movement information for positioning a cursor for pointing to said information entities, binary control means for generating binary control commands for said computer, supplementary control means for generating a supplementary control signal of a variable sign and a variable magnitude under control of said operator, and communication means for transmitting said movement information, said binary control information and said supplementary control signal to said computer; and programmable circuit means for generating said information entities displayed in said display means;
  said method comprising generating incremental scrolling commands from said supplementary control signal for moving said information entities on said display means by operation of said supplementary control means by said operator, said method including the steps of:
  a) analyzing a trail of said cursor at periodic time intervals;
  b) determining similarity of said trail of said cursor to any of a plurality of pre-defined complex cursor trail patterns at each of said periodic time intervals;
  c) dynamically setting a scrolling axis option and a scrolling scale option, according to the one of said pre-defined complex patterns for which said similarity is maximum;
  d) scrolling said information entities in a scrolling direction along said scrolling axis option determined in step c) and according to a sign of said supplementary control signal, and in said scrolling scale option determined in step c).

12. Method as defined in claim 11, wherein said scrolling axis options include an up-down option, a left-right option and an in-out option, and said scrolling scale options include a lower scrolling scale option and a higher scrolling scale option.

13. Method as defined in claim 12, further comprising the step of scrolling in said scrolling direction and in said scrolling scale option at a plurality of scrolling modes depending on said magnitude of said supplementary control signal.

14. Method as defined in claim 13, wherein said plurality of scrolling modes includes a single-step mode comprising generating a single incremental scrolling command when said magnitude of said supplemental control signal crosses a first pre-determined magnitude threshold and only when said magnitude grows from a lower value to a higher value.

15. Method as defined in claim 14, wherein said plurality of scrolling modes further includes a autonomous variable rate mode comprising automatic generation of incremental scrolling commands when said magnitude of said supplementary control signal is larger that a second pre-determined magnitude threshold, said rate being related to said magnitude.

16. Mouse driver arrangement for improving interactive operation of a computer by an operator using a mouse,
  said computer including display means for displaying visual information to said operator, processing means for generating and managing said visual information, memory means for storing one or more programs running in said computer and temporary data, and real-time clock means for providing synchronizing signals to said programs,
  said mouse including means for generating x-y incremental movement information for driving a cursor to any of a plurality of cursor positions on said display means for pointing to information entities displayed thereon, binary control means for generating binary control information, supplementary control means for generating a supplementary control signal of a variable sign and a variable magnitude under control of said operator, and communication means for transmitting said movement information, said binary control information and said supplementary control signal to said computer,
  said mouse driver arrangement comprising first processing means for capturing said x-y incremental movement information and said binary control information to generate cursor control signals for positioning said cursor on said display;
  said mouse driver arrangement further including:
  second processing means for storing said x-y incremental movement information as coordinates of successive cursor positions measured at each of said synchronizing signals,
  third processing means for analyzing said coordinates to detect first pre-defined patterns in movement of said cursor, said first pre-defined patterns being interpreted as dynamic scrolling axis commands issued by said operator,
  fourth processing means for analyzing said coordinates to detect second pre-defined patterns in movement of said cursor, said second pre-defined patterns being interpreted as dynamic scrolling scale commands issued by said operator,
  fifth processing means for generating incremental scrolling commands for scrolling said visual information upon generation of said supplementary control signal, said incremental scrolling commands being determined by detection of said first and second pre-defined patterns and said sign of said supplementary control signal.

17. The arrangement of claim 16, wherein said arrangement further includes sixth processing means for processing said supplementary control signal, said sixth processing means generating a first strobe output signal activated when said magnitude crosses a first pre-defined magnitude threshold growing from a lower magnitude value to a higher magnitude value, said strobe signal triggering a single unit of said incremental scrolling commands.

18. The arrangement of claim 17, wherein said sixth processing means further generates a second output flag signal activated when said magnitude exceeds a second pre-defined magnitude threshold, said flag signal enabling the generation of said incremental scrolling commands by said fifth processing means at an autonomous rate determined by said magnitude.

* * * * *